(12) United States Patent
Shrivastava et al.

(10) Patent No.: US 10,288,003 B1
(45) Date of Patent: May 14, 2019

(54) SYSTEM AND METHOD OF VALVE WEAR DETECTION

(71) Applicant: General Electric Company, Schenectady, NY (US)

(72) Inventors: Amit Shrivastava, Bangalore (IN); Chandan Kumar, Hyderabad (IN); Pavan Chakravarthy Nandigama, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/796,124

(22) Filed: Oct. 27, 2017

(51) Int. Cl.
*F02D 41/22* (2006.01)
*F02D 41/24* (2006.01)

(52) U.S. Cl.
CPC ......... *F02D 41/22* (2013.01); *F02D 41/2451* (2013.01); *F01L 2800/11* (2013.01); *F02D 2041/224* (2013.01); *F02D 2041/228* (2013.01)

(58) Field of Classification Search
CPC ............... F02D 41/22; F02D 41/2451; F02D 2041/224; F02D 2041/228; F01L 2800/11
See application file for complete search history.

(56) References Cited

U.S. PATENT DOCUMENTS

| 2013/0304352 A1 | 11/2013 | MacFarlane et al. |
| 2014/0331969 A1* | 11/2014 | Bidner .................. F02M 25/00 123/434 |

* cited by examiner

*Primary Examiner* — Hung Q Nguyen
*Assistant Examiner* — Xiao En Mo
(74) *Attorney, Agent, or Firm* — Fletcher Yoder, P.C.

(57) ABSTRACT

A system includes a reciprocating engine having a piston disposed in a cylinder, an intake valve, an exhaust valve, and an exhaust flow path downstream of the exhaust valve. The system also includes a first sensor configured to obtain a first feedback indicative of an exhaust gas parameter in the exhaust flow path. The system also includes a controller configured to identify a valve wear condition of at least one of the intake valve or the exhaust valve at least partially based on the first feedback from the first sensor.

13 Claims, 10 Drawing Sheets

SYSTEM AND METHOD OF VALVE WEAR DETECTION

BACKGROUND OF THE INVENTION

The subject matter disclosed herein relates to combustion engines and, more specifically, to a system and method for detecting operating events and conditions of a reciprocating combustion engine using one or more sensors.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder. The air then mixes with fuel and combusts to generate hot combustion gases, which may then be directed to exit the cylinder via an exhaust valve. The timing of opening and closing the valves may affect engine performance, longevity of parts, exhaust emissions, and other engine parameters. Unfortunately, improper timing may negatively impact the foregoing engine parameters.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a reciprocating engine having a piston disposed in a cylinder, an intake valve, an exhaust valve, and an exhaust flow path downstream of the exhaust valve. The system also includes a first sensor configured to obtain a first feedback indicative of an exhaust gas parameter in the exhaust flow path. The system also includes a controller configured to identify a valve wear condition of at least one of the intake valve or the exhaust valve at least partially based on the first feedback from the first sensor.

In a second embodiment, an apparatus a non-transitory computer readable medium includes executable instructions that, when executed, cause a processor to obtain, from a first sensor, a first feedback indicative of an exhaust gas parameter in an exhaust flow path downstream from an exhaust valve of a reciprocating engine. The reciprocating engine has a piston disposed in a cylinder, an intake valve, and the exhaust valve. The executable instructions that, when executed, also cause the process to identify a valve wear condition of at least one of the intake valve or the exhaust valve at least partially based on the first feedback from the first sensor.

In a third embodiment, a method includes obtaining, from a first sensor, a first feedback indicative of an exhaust gas parameter in an exhaust flow path downstream from an exhaust valve of a reciprocating engine. The reciprocating engine has a piston disposed in a cylinder, an intake valve, and the exhaust valve. The method also includes identifying a valve wear condition of at least one of the intake valve or the exhaust valve at least partially based on the first feedback from the first sensor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include a system and method for evaluating operational parameters of an engine (e.g., a reciprocating combustion engine) to determine the possibility of wear to intake and/or exhaust valves. For example, an electronic controller may be utilized to evaluate signals from various sensors positioned throughout the engine against a set of baseline values and/or threshold values. The sensors may obtain feedback indicative of residual oxidant (e.g., oxygen), unburn fuel, or a combination thereof, in the combustion gases (e.g., exhaust gas). The sensors may obtain feedback indicative of gas composition of the combustion gases. The sensors also may obtain feedback indicative of temperature and/or pressure in each combustion chamber (e.g., inside cylinder above piston), in an engine intake manifold, an engine exhaust manifold, or any combination thereof. By determining whether or not the signals fall outside of the threshold values, changes in the operational conditions of the engine may be identified. As a result, further operational parameters may be identified to determine the likelihood that valve wear is occurring. In certain embodiments, operational changes may be indicative of valve wear, thereby enabling the electronic controller to change operational conditions of the engine, send stop signals (e.g., engine shutdown), schedule maintenance or repair, or alert the operator of potential valve wear.

Figure 1:
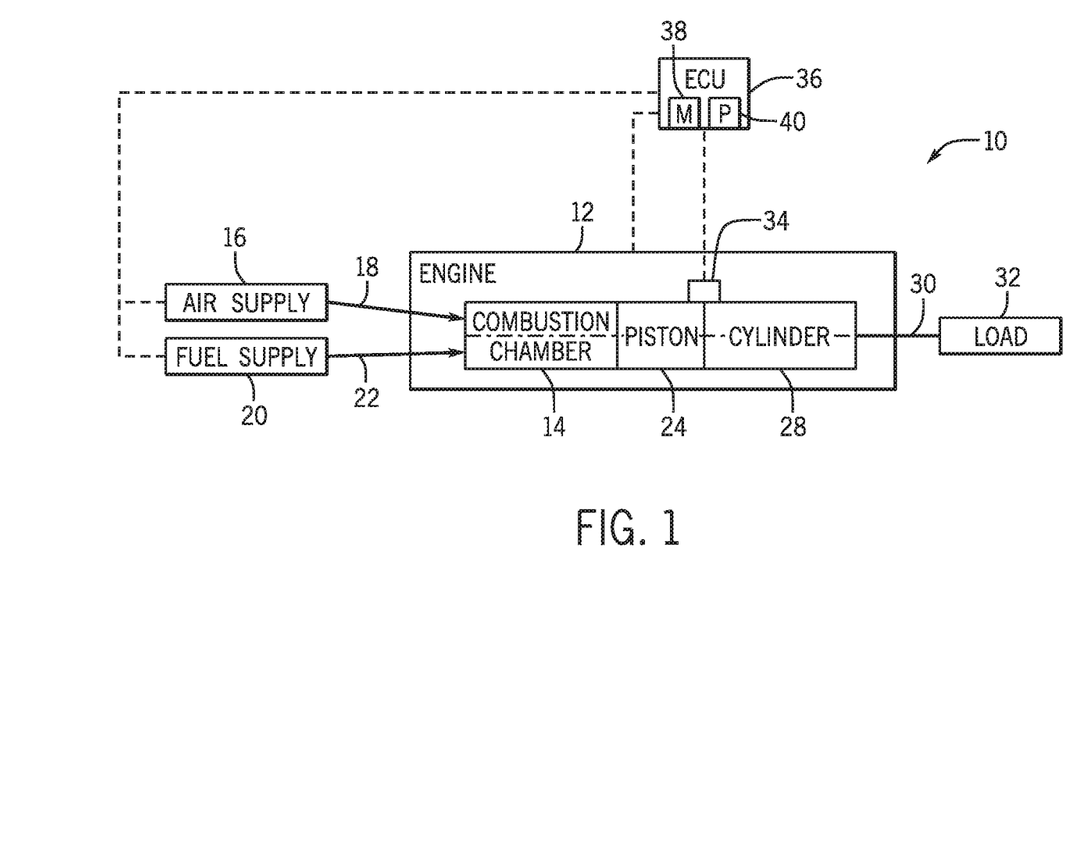
FIG. 1 is a block diagram of an embodiment of an engine driven power generation system.

Turning to the drawings, FIG. 1 illustrates a block diagram of an embodiment of a portion of an engine driven power generation system 10. As described in detail below, the system 10 includes an engine 12 (e.g., a reciprocating internal combustion engine) having one or more combustion chambers 14 (e.g., 1, 2, 3, 4, 5, 6, 7, 8, 10, 12, 14, 16, 18, 20, or more combustion chambers 14). An air supply 16 is configured to provide a pressurized oxidant 18, such as air, oxygen, oxygen-enriched air, oxygen-reduced air, or any combination thereof, to each combustion chamber 14. The combustion chamber 14 is also configured to receive a fuel 20 (e.g., a liquid and/or gaseous fuel) from a fuel supply 22, and a fuel-air mixture ignites and combusts within each combustion chamber 14. The hot pressurized combustion gases exert pressure onto a piston 24 adjacent to each combustion chamber 14. The pressure drives the piston 24 to reciprocate within a cylinder 28 (e.g., an engine cylinder). Moreover, the reciprocating movement of the piston 24 drives a shaft 30 to rotate. Further, the shaft 30 may be coupled to a load 32, which is powered via rotation of the shaft 30. For example, the load 32 may be any suitable device that may generate power via the rotational output of the system 10, such as an electrical generator. Additionally, although the following discussion refers to air as the oxidant 18, any suitable oxidant may be used with the disclosed embodiments. Similarly, the fuel 20 may be any suitable gaseous fuel, such as natural gas, associated petroleum gas, propane, biogas, sewage gas, landfill gas, coal mine gas, for example.

The system 10 disclosed herein may be adapted for use in stationary applications (e.g., in industrial power generating engines) or in mobile applications (e.g., in cars or aircraft). The engine 12 may be a two-stroke engine, three-stroke engine, four-stroke engine, five-stroke engine, or six-stroke engine. The engine 12 may also include any number of combustion chambers 14, pistons 24, and associated cylinders 28 (e.g., 1-24). For example, in certain embodiments, the system 10 may include a large-scale industrial reciprocating engine having 4, 6, 8, 10, 16, 24 or more pistons 20 reciprocating in cylinders 28. In some such cases, the cylinders 28 and/or the pistons 20 may have a diameter of between approximately 13.5-34 centimeters (cm). In some embodiments, the cylinders 28 and/or the pistons 20 may have a diameter of between approximately 10-40 cm, 15-25 cm, or about 15 cm. The system 10 may generate power ranging from 10 kW to 10 MW. In some embodiments, the engine 12 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 12 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 10 may include one or more sensors 34 suitable for detecting one or more parameters of the engine 12. For example, the sensors 34 may include gas composition sensors (e.g., oxygen sensors and/or fuel sensors), knock sensors, temperature sensors, pressure sensors, or the like. As used herein, the oxygen sensor may refer to the sensor 34 configured to detect a quantity of oxygen in a gaseous flow (e.g., a total quantity of oxygen or a percentage of oxygen in the flow). Moreover, the fuel sensor may refer to the sensor 34 configured to detect a quality of fuel in a gaseous flow (e.g., residual unburn fuel). As used herein, the knock sensor may refer to the sensor 34 configured to sense sounds or vibrations caused by the engine 12, such as sound or vibration due to detonation, pre-ignition, and or pinging. In the illustrated embodiment, the sensor 34 is shown communicatively coupled to an engine controller 36 (e.g., engine control unit (ECU), an electronic controller). During operations, signals from the sensor 34 are communicated to the ECU 36 to monitor at least one parameter of the engine 12. For example, the ECU 36 may be configured to monitor residual/unused oxygen and/or residual/unburn fuel in an exhaust after the fuel 20 is combusted within the cylinder 28 to determine whether the amount of residual oxygen or residual fuel is within predefined limits. The ECU 36 may then adjust certain engine parameters to bring the oxygen content within the predefined limits, send a signal to an operator, or a combination thereof. In the illustrated embodiment, the ECU 36 may be a controller, which includes a memory 38 and a processor 40. The memory 38 may include a mass storage device, a FLASH memory device, removable memory, or any other non-transitory computer-readable medium (e.g., not only a signal). Additionally and/or alternatively, the instructions may be stored in an additional suitable article of manufacture that includes at least one tangible, non-transitory computer-readable medium that at least collectively stores these instructions or routines in a manner similar to the memory 38 as described above.

Figure 2:
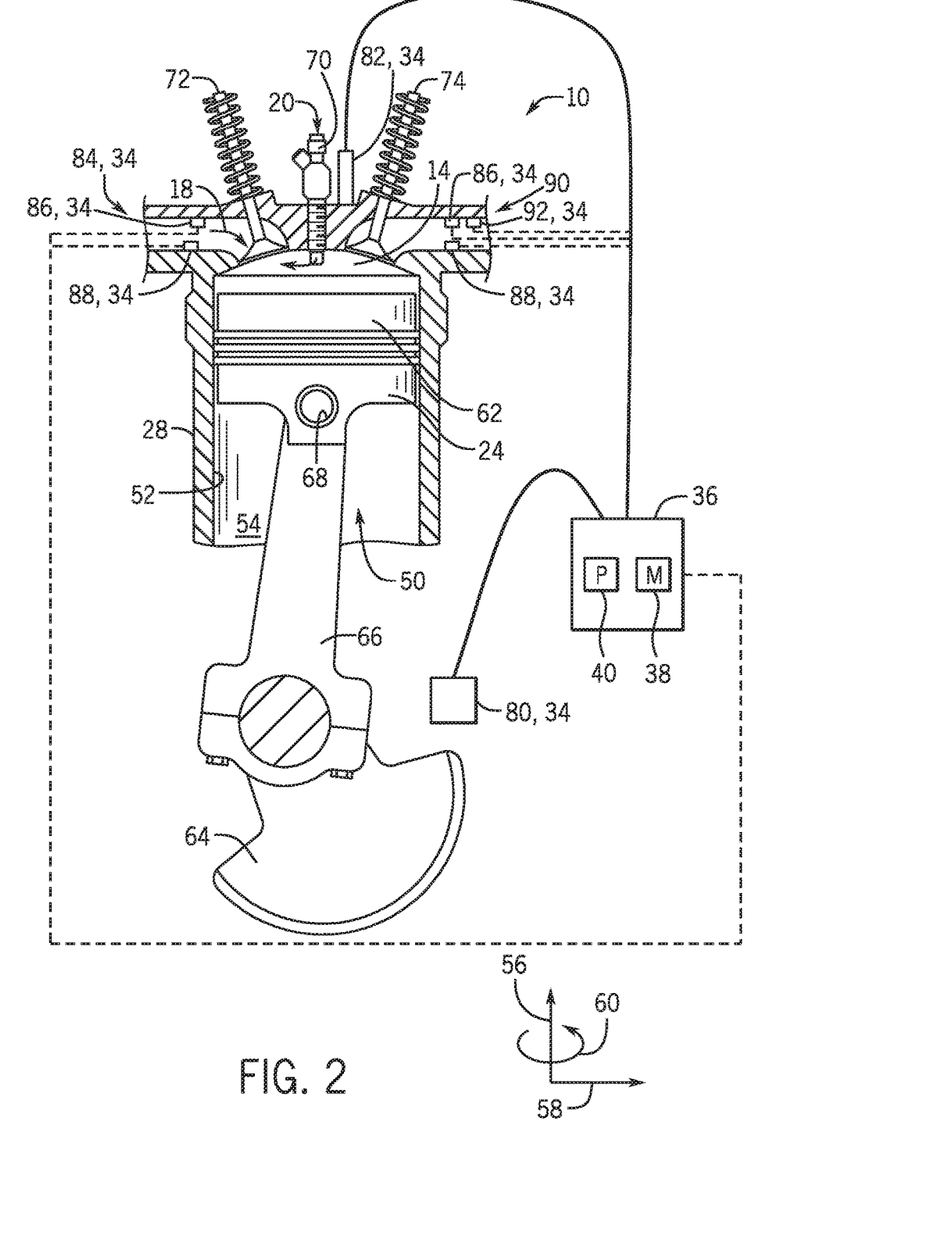
FIG. 2 is a schematic cross-sectional view of an embodiment of a piston-cylinder assembly of a reciprocating combustion engine.

FIG. 2 is a side cross-sectional view of an embodiment of a piston-cylinder assembly 50 having the piston 24 disposed within the cylinder 28 of the reciprocating engine 10. The cylinder 26 has an inner annular wall 52 defining a cylindrical cavity 54 (e.g., bore, annular bore). The piston 24 may be defined by an axial axis or direction 56, a radial axis or direction 58, and a circumferential axis or direction 60. The piston 24 includes a top portion 62 (e.g., a top land). The top portion 62 generally blocks the fuel 20 and the air 18, or a fuel-air mixture, from escaping from the combustion chamber 14 during reciprocating motion of the piston 24.

As shown, the piston 24 is coupled to a crankshaft 64 via a connecting rod 66 and a pin 68. The crankshaft 64 translates the reciprocating linear motion of the piston 24 into a rotating motion. As the piston 24 moves, the crankshaft 64 rotates to power the load 32 (shown in FIG. 1), as discussed above. As shown, the combustion chamber 14 is positioned adjacent to the top land 62 of the piston 24. A fuel injector 70 provides the fuel 20 to the combustion chamber 14, and an intake valve 72 controls the delivery of air 18 to the combustion chamber 14. An exhaust valve 74 controls discharge of exhaust from the engine 12. However, it should be understood that any suitable elements and/or techniques for providing fuel 20 and air 18 to the combustion chamber 14 and/or for discharging exhaust may be utilized, and in some embodiments, no fuel injection is used. In operation, combustion of the fuel 20 with the air 18 in the combustion chamber 14 cause the piston 24 to move in a reciprocating manner (e.g., back and forth) in the axial direction 56 within the cavity 54 of the cylinder 28.

During operations, when the piston 24 is at the highest point in the cylinder 28 it is in a position called top dead center (TDC). When the piston 24 is at its lowest point in the cylinder 28, it is in a position called bottom dead center (BDC). As the piston 24 moves from top to bottom or from bottom to top, the crankshaft 64 rotates one half of a revolution. Each movement of the piston 24 from top to bottom or from bottom to top is called a stroke, and engine 12 embodiments may include two-stroke engines, three-stroke engines, four-stroke engines, five-stroke engine, six-stroke engines, or more.

During engine 12 operations, a sequence including an intake process, a compression process, a power process, and an exhaust process occurs. The intake process enables a combustible mixture, such as fuel and air, to be pulled into the cylinder 28, thus the intake valve 72 is open and the exhaust valve 74 is closed. The compression process compresses the combustible mixture into a smaller space, so both the intake valve 72 and the exhaust valve 74 are closed. The power process ignites the compressed fuel-air mixture, which may include a spark ignition through a spark plug system, and/or a compression ignition through compression heat. The resulting pressure from combustion then forces the piston 24 to BDC. The exhaust process returns the piston 24 to TDC while keeping the exhaust valve 74 open. The exhaust process thus expels the spent fuel-air mixture through the exhaust valve 74. It is to be noted that more than one intake valve 72 and exhaust valve 74 may be used per cylinder 28.

In the illustrated embodiment, various sensors 34 are distributed throughout the system 10 to monitor one or more parameters of the piston-cylinder assembly 50 during operation. For example, a crankshaft sensor 80 is positioned proximate the crankshaft 64 to sense the position and/or rotational speed of the crankshaft 64. Accordingly, a crank angle or crank timing information may be derived from the sensor feedback via the ECU 36. That is, when monitoring combustion engines, timing is expressed in terms of crankshaft 64 angle. For example, a full cycle of a four stroke engine 12 may be measured as a 720° cycle. As will be described below, monitoring the lift of the intake valve 72 and/or the exhaust valve 74 relative to the crank angle may be utilized to detect wear on the intake valve 72 and/or the exhaust valve 74. As used herein, wear refers to deformation, erosion, corrosion, or the like to a valve body that may hinder and/or block full opening or closure of the valve.

Moreover, a knock sensor 82 is positioned is positioned proximate the combustion chamber 24 to sense vibration, acceleration, sound, and/or movement. For example, the knock sensor 82 may be a Piezo-electric accelerometer, a microelectromechanical system (MEMS) sensor, a Hall effect sensor, a magnetostrictive sensor, and/or any other sensor designed to sense vibration, acceleration, sound, noise, and/or movement. In some embodiments, knock sensor 82 may not be a knock sensor in the traditional sense, but the knock sensor 82 may include any sensor that may sense vibration, pressure, acceleration, deflection, or movement, and may not be used to detect engine "knock." Because of the percussive nature of the engine 12, the knock sensor 82 may be capable of detecting signatures even when mounted on the exterior of the cylinder 28. As used herein, signatures refer to at least one set of data indicative of a noise event (e.g., opening/closing of a valve) corresponding to the valves 72, 74. However, the knock sensor 82 may be disposed at various locations in or about the cylinder 28. Additionally, in some embodiments, a single knock sensor 82 may be shared, for example, with one or more adjacent cylinders 28. In some embodiments, each cylinder 28 may include one or more knock sensors 82.

In the illustrated embodiment, an intake manifold 84 includes a pressure sensor 86 and a temperature sensor 88. The pressure sensor 86 is configured to monitor the pressure in the intake manifold 84 as the intake valve 72 opens and closes to enable the oxidant 18 to enter the combustion chamber 14. As will be described below, by monitoring the pressure of the intake manifold 84 over operation of the engine 12, a decrease in pressure may be indicative of wear to the intake valve 72, thereby enabling oxidant 18 to continuously leak into and/or out of the combustion chamber 14 during operation. Moreover, the intake manifold 84 includes the temperature sensor 88 to monitor the temperature of the intake manifold 84 during operation of the engine 12 to evaluate intake valve 72 wear. In certain embodiments, each cylinder 28 may include individual pressure and temperature sensors 86, 88 at the piston assemblies 50. However, in some embodiments, adjacent cylinders 28 may share the pressure and/or temperature sensors 86, 88.

Furthermore, an exhaust manifold 90 may include one or more of the pressure and temperature sensors 86, 88. As described above, the exhaust manifold 90 receives hot combustion gases from the combustion chamber 14. For example, as the piston 24 returns to TDC, the exhaust gases may enter the exhaust manifold 90 as the exhaust valve 74 is in the open position. As will be described below, wear in the exhaust valve 74 may be represented by higher exhaust manifold pressures or lower exhaust manifold temperatures. Moreover, in certain embodiments, individual sensors 34 (e.g., pressure and temperature sensors 86, 88) may be positioned at the exhaust of each piston-cylinder assembly 50. Furthermore, in some embodiments, different piston-cylinder assemblies 50 from a plurality of piston-cylinder assemblies 50 may be evaluated based on timing (e.g., firing order) while the feedback is evaluated to determine which piston-cylinder assemblies 50 may have valve wear.

Additionally, in the illustrated embodiment, the exhaust manifold 90 includes an oxygen sensor 92 (e.g., a lambda sensor). As described above, the oxygen sensor 92 is configured to measure an amount of residual unused oxygen present in the exhaust manifold 90 (i.e., oxygen not used in the combustion reaction). In certain embodiments, the oxygen sensor may determine a percentage of oxygen in the exhaust flow. By determining the percentage of oxygen in the exhaust manifold 90, the valve wear of the exhaust valve 74 may be determined by the ECU 36. For example, a higher oxygen content in the exhaust manifold 90 may be indicative of non-combusted oxygen leaking from the combustion chamber 14, around the exhaust valves, and into the exhaust manifold 90. As a result, the oxygen sensor 92 may be utilized to monitor leakage into the exhaust manifold 90, in the cylinder 28, and/or other associated piping or equipment. In certain embodiments, the oxygen sensor 92 monitors a threshold amount to determine whether additional data analysis is performed. For example, a predetermined percentage of oxygen may be present in the exhaust manifold 90 before additional analysis of other operational parameters of the engine 12 is conducted.

In the illustrated embodiment, the sensors 34 (e.g., crankshaft sensor 80, knock sensor 82, pressure sensor 86, temperature sensor 90, and/or oxygen sensor 92) are communicatively coupled to the ECU 36. That is, the ECU 36 may receive one or more signals from the sensors 34 indicative of the operational parameters of the engine 12. The ECU 36 may evaluate the signal via the processor 40 with values stored on the memory 38. For example, the ECU 36 may compare the percentage of oxygen and/or fuel in the exhaust manifold 90 to a predetermined limit, or compare the pressure and/or temperature in the intake manifold 84 with a threshold set of values, or compare the pressure and/or temperature in the exhaust manifold 90 with a threshold set of values.

Figure 3:
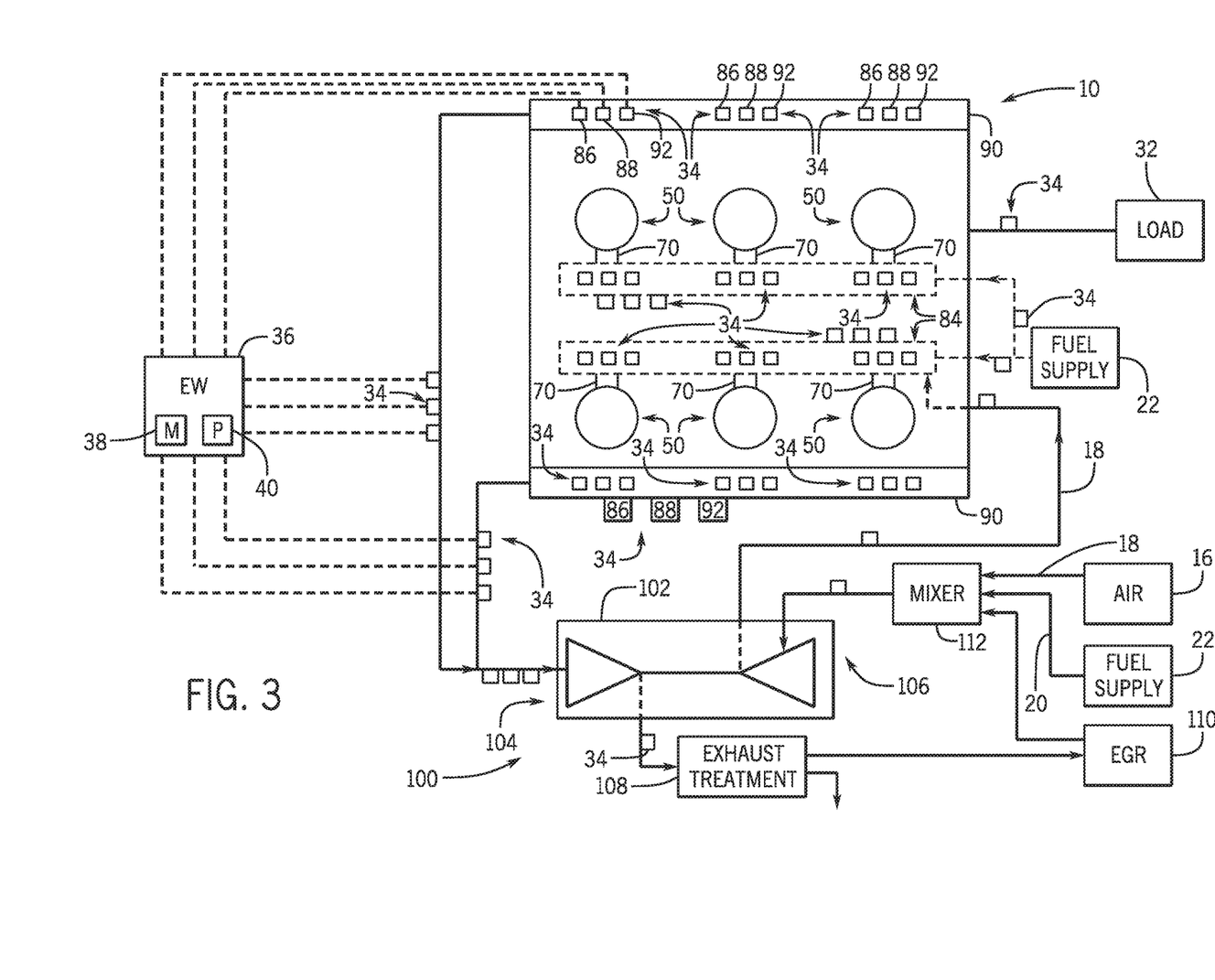
FIG. 3 is a block diagram of an embodiment of an engine driven power assembly having multiple piston-cylinder assemblies.

FIG. 3 is a schematic diagram of the engine driven power system 10 having an exhaust system 100 configured to recover exhaust gas from the exhaust manifold 90 for utilization during operation of the system 10. For example, as described above, the engine 12 may include a plurality of piston assemblies 50 configured to drive motion of the crankshaft 64 to provide power to the load 32. In the illustrated embodiment, the engine 12 includes six piston assemblies 50. However, in some embodiments, the engine 12 may include any suitable number of piston assemblies (e.g., 1, 2, 3, 4, 8, 10, 12, etc.). As described above, the fuel 20 from the fuel supply 22 is configured to enter the fuel injectors 70, while the oxidant 18 enters the intake manifold 84 for later combination and combustion within the combustion chamber 14. Thereafter, the exhaust gases may exit the combustion chamber 14 and enter the exhaust manifold 90. In the illustrated embodiment, the exhaust gases are directed toward a turbocharger 102. In the illustrated embodiment, the exhaust gases may enter a turbine side 104, while the oxidant 18 enters a compressor side 106. In the illustrated embodiment, exhaust from the turbine side 104 may enter an exhaust treatment system 108. The exhaust treatment system 108 may be configured to remove selected impurities or particulates from the exhaust to enable recirculation through the system 10. For example, the exhaust treatment system 108 may include filters, absorption beds, adsorption beds, or the like. In certain embodiments, the exhaust treatment system 108 may direct the processed exhaust to an exhaust gas recovery unit 110 to be combined with the fuel 20 and oxidant 18 in a mixer 112. Thereafter, the combination may be directed to the compressor side 106 and transported toward the engine 12 for reuse within the system 10.

As described above, sensors 34 may be positioned at numerous locations throughout the system 10 to measure one or more parameters of operation. For example, the exhaust manifolds 90 may include the pressure sensor 86, temperature sensor 88, residual fuel sensor, and/or the oxygen sensor 92. In the illustrated embodiment, each piston-cylinder assembly 50 includes an individual pressure, temperature, and oxygen sensor 86, 88, 92. However, in certain embodiments, the exhaust manifold 90 may include pressure, temperatures, and oxygen sensors 86, 88, 92 to measure the overall operational parameters within the exhaust manifold 90 as a whole, instead of individually at each piston-cylinder assembly 50. Moreover, in the illustrated embodiment, both the overall exhaust manifold 90 and each individual piston-cylinder assembly 50 may include pressure, temperature, residual fuel sensor, and oxygen sensors 86, 88, 92. Additionally, as shown, the sensors 34 may be distributed on the exhaust lines (e.g., exhaust pipes, exhaust conduits, etc.) directing the exhaust from the exhaust manifold 90 to the turbocharger 102, on the intake manifold 84, or other areas throughout the system 10. Moreover, the sensors 34 may be communicatively coupled to the ECU 36 to enable continuous operation and/or adjustment of the operating parameters of the system 10.

As described above, monitoring the operational parameters of the system 10 may enable operators to detect valve wear in the piston assemblies 50 while the engine 12 is operational. In certain embodiments, the ECU 36 may be configured to receive signals from the sensors 34 indicative of operational parameters of the system 10. Moreover, the processor 40 may be configured to continuously monitor the signals during operation of the system 10. Furthermore, the memory 38 may include predetermined values, or ranges of valves, associated with the operational parameters. For example, the memory 38 may include a threshold value (e.g., upper value, lower value, predetermined range) of the exhaust manifold pressure, the exhaust manifold temperature, the exhaust manifold oxygen content, and/or the exhaust manifold fuel content. As will be described below, one or a combination of the parameters (e.g., pressure, temperature, oxygen, fuel content) may be utilized to detect valve wear. The processor 40 may evaluate the signal indicative of the exhaust manifold pressure, the exhaust manifold temperature, the exhaust manifold oxygen content, and/or the exhaust manifold fuel content, over a time interval. In embodiments in which the value of the signal is outside of the threshold value for the time interval, the processor 40 may be configured to trigger an alarm or indication indicative of the parameter being outside of the predetermined range.

Figure 4:
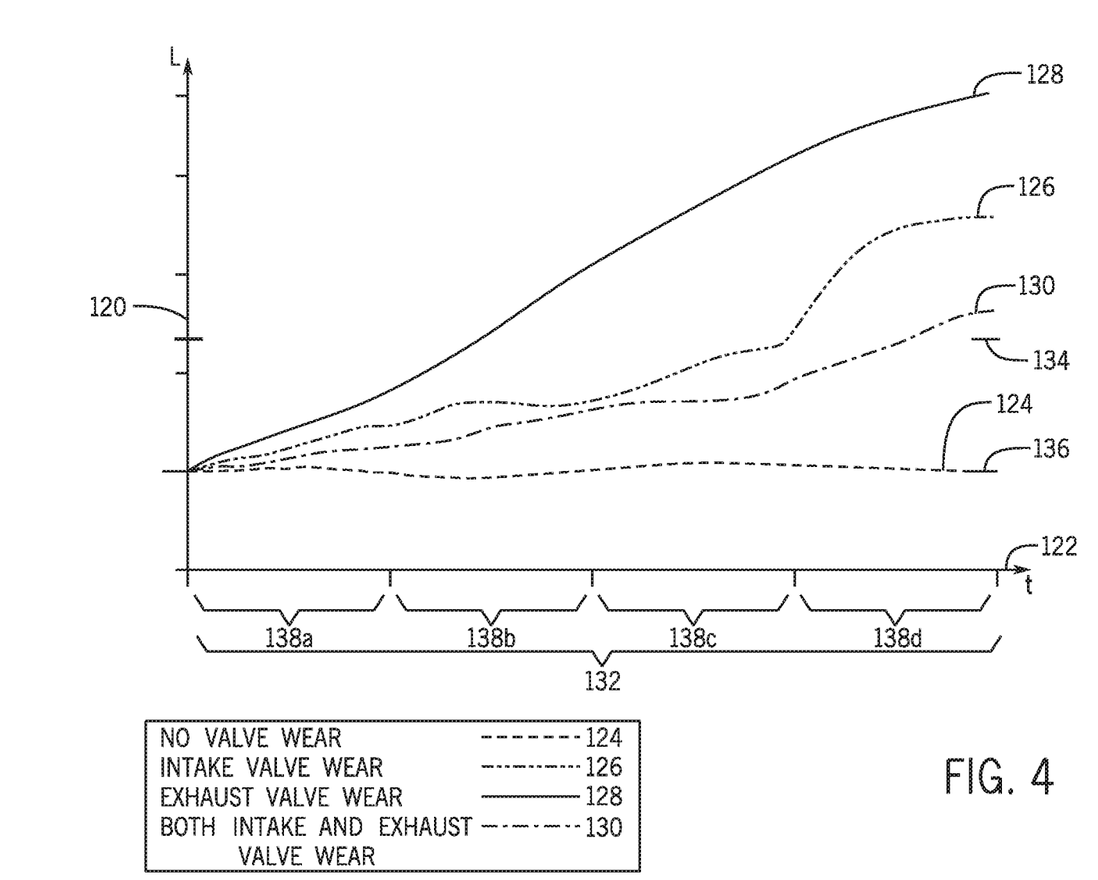
FIG. 4 is an embodiment of a graphical output of an oxygen sensor over a time period.

FIG. 4 is an embodiment of a graph monitoring the oxygen content (e.g., lambda value) of the exhaust manifold 90. However, as described above, in certain embodiments the oxygen content of the individual cylinders 28 may be monitored separately. In the illustrated embodiment, the vertical axis 120 represents the oxygen content and the horizontal axis 122 represents time. As shown, the oxygen content in the exhaust manifold 90 is monitored over a period of time to determine whether changes in the oxygen content are indicative of valve wear. For example, a line 124 represents a no-wear scenario in which neither the intake valve 72 nor the exhaust valve 74 has appreciable wear. As used herein, appreciable wear refers to a state of valve wear in which performance of the engine 12 is not changed or hindered due to the wear on the intake or exhaust valves 72, 74. Moreover, a line 126 represents an intake valve wear scenario, a line 128 represents an exhaust valve wear scenario, and a line 130 represents both an intake and exhaust valve wear scenario. As will be described below, by monitoring changes in the oxygen content during operation of the system 10 over the entire time period and/or specified time intervals, valve wear may be identified while the engine 12 is operational. Moreover, in some embodiments, timing is also evaluated (e.g., firing order for a plurality of piston-cylinder assemblies 50). As a result, if the ECU 36 determines the possibility of valve wear is increased, the ECU 36 may also evaluate the timing to determine which piston-cylinder assembly 50 of the plurality of piston-cylinder assemblies 50 may have valve wear.

In the illustrated embodiment, the line 124 is substantially constant over a time period 132. That is, the value of the oxygen content does not significantly change over the time period 132. In certain embodiments, a threshold value 134 may be utilized to determine whether the intake valve 72 and/or the exhaust valve 74 has wear. For example, the threshold value 134 may be approximately 20% higher than a baseline value 136. However, in some embodiments, the threshold value 134 may be 5, 10, 15, 20, 25, 30, 35, 40, 45, 50, 55, 60, 65, 70, 75, 100, 125, 150, or 200 percent higher than the baseline value 136, or any suitable percentage higher than the baseline value 136. Additionally, in some embodiments, the threshold value 134 may be approximately 20% lower than a baseline value 136. However, in some embodiments, the threshold value 134 may be 5, 10, 15, 20, 25, 30, 35, 40, 45, 50, 55, 60, 65, 70, 75, 100, 125, 150, or 200 percent lower than the baseline value 136, or any suitable percentage lower than the baseline value 136. Moreover, in some embodiments, the threshold value 134 may be predetermined based on experimental conditions. By comparing the oxygen content over different time intervals 138, the ECU 36 may determine whether the intake valve 72 and/or the exhaust valve 74 is experiencing wear. Moreover, evaluating the timing (e.g., firing order) may enable the ECU 36 to determine which piston-cylinder assembly 50 of a plurality of piston-cylinder assemblies 50 has valve wear.

As described above, the line 124 may represent the no-wear scenario in which both the intake valve 72 and the exhaust valve 74 are sealing at the intervals, thereby blocking excess, non-combusted oxygen from entering the exhaust manifold 90. In the illustrated embodiment, oxygen content over the time period 132 represented by the line 124 may be approximately equal to the baseline value 136. As will be appreciated, the baseline value 136 may be determined by experimental operations of the engine 12, normal operations of the engine 12 or a group of engines (e.g., new engines), computer modeling, calculations, user inputs, or the like. As shown, the oxygen content corresponding to the value of the line 124 may be evaluated over the time intervals 138*a*, 138*b*, 138*c*, 138*d*. In the illustrated embodiment, the oxygen content corresponding to the value of the line 124 does not increase higher (e.g., have a value larger) than the threshold value 134. As a result, the ECU 36 may determine that the potential for appreciable valve wear is low for the line 124.

Additionally, as described above, the line 126 may represent the intake valve wear scenario. That is, wear (e.g., corrosion, erosion, deformation, etc.) to the intake valve 72 may facilitate oxidant 18 leakage into the combustion chamber 14, thereby creating an air-to-fuel (A/F) ratio that is leaner (e.g., higher) than the normal operating conditions. As a result, performance of the engine 12 may drop and/or unused oxygen may enter the exhaust manifold 90. In the illustrated embodiment, the ECU 36 monitors the oxygen content corresponding to the line 126 across the time period 132. As shown, during the time interval 138*d*, the oxygen content corresponding to the line 126 is greater than the threshold value 134. That is, the amount of unused oxygen is at a level indicative of valve wear. Accordingly, the ECU 36 may determine the possibility of wear to the intake valve 72 is increased.

In the illustrated embodiment, the line 128 represents the exhaust valve wear scenario. During the exhaust valve wear scenario, wear to the exhaust valve 72 may facilitate oxidant 18 leakage into the exhaust manifold 90. For example, as oxidant enters the combustion chamber 14 from the intake manifold 84, a fluid pathway between the combustion chamber 14 and the exhaust manifold 90 may not be sealed (e.g., because of wear to exhaust valve 74), thereby enabling the oxidant 18 to enter the exhaust manifold 90 before combustion in the combustion chamber 14. As shown, by monitoring the oxygen content corresponding to the line 128 over the time period 132, the oxygen content may be detected as larger than the threshold value 134 during the time interval 138*b*, and remain larger than the threshold value 134 throughout the time intervals 138*c*, 138*d*. As a result, the ECU 36 may determine the possibility of valve wear is increased.

Moreover, the line 130 may represent both the intake and exhaust valve wear scenario. As described above, in certain embodiments, wear may be present on both the intake valve 72 and the exhaust valve 74. In the illustrated embodiment, the oxygen content corresponding to the line 130 is larger than the threshold value 134 during the time interval 138*d*. Accordingly, the possibly of wear may be increased. In certain embodiments, the value of oxygen content may be utilized to determine the type of wear present. For example, the exhaust valve wear scenario may correspond to a higher oxygen content than the intake valve wear scenario and/or both the intake and exhaust valve wear scenario. Moreover, in some embodiments, monitoring of the oxygen content may continue for a predetermined time interval 138 after detection above the threshold value 134 is detected. For example, the oxygen content may exceed the threshold value 134 by 1, 2, 3, 4, 5, 6, 7, or any suitable number of time intervals (e.g., one stroke, two strokes, three strokes, or any suitable number of strokes), because the ECU 36 determines the possibly of valve wear is increased. As a result, intermittent increases in oxygen content in the exhaust manifold 90 may not be registered as valve wear, thereby decreasing the possibility of false positive identifications of valve wear.

Figure 5:
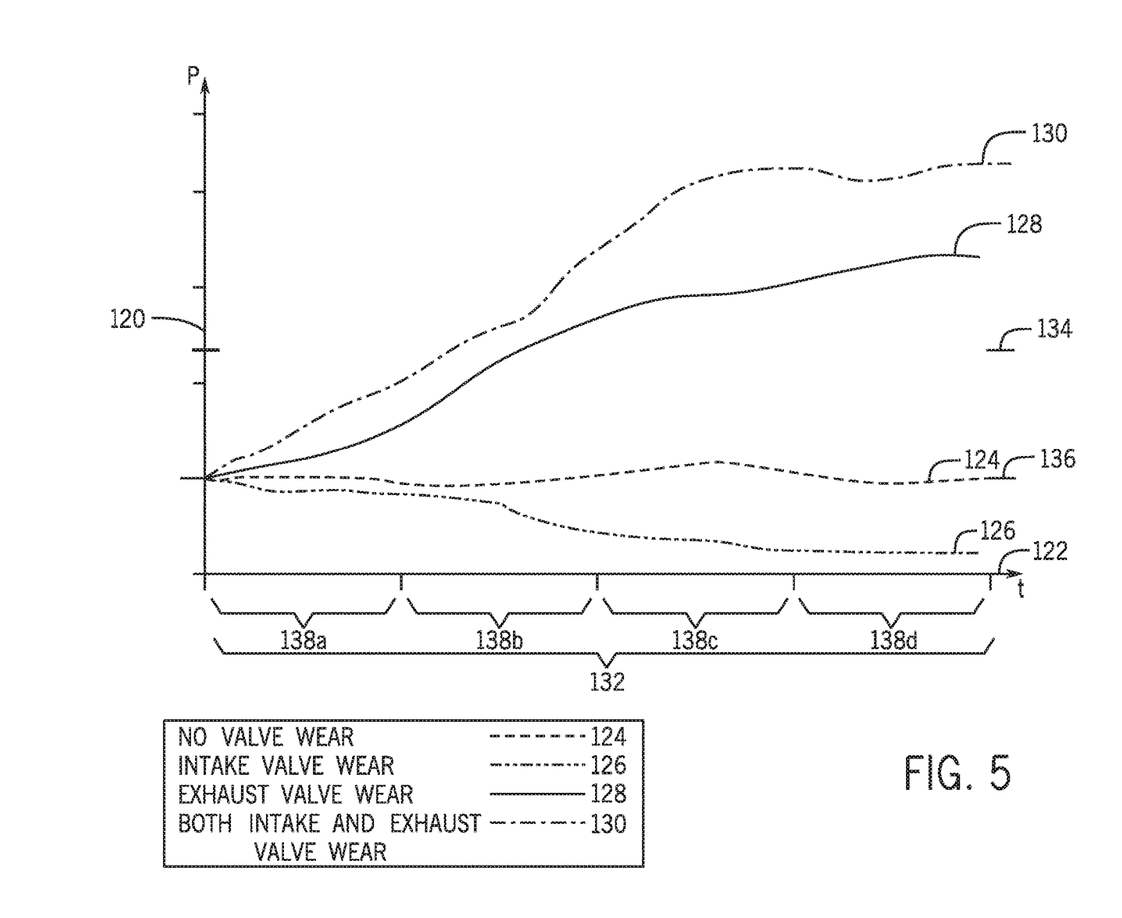
FIG. 5 is an embodiment of a graphical output of a pressure sensor over a time period.

As described above, oxygen content in the exhaust manifold 90 may be utilized to determine the possibility of valve wear to the intake valve 72 and the exhaust valve 74. However, in certain embodiments, the increase in oxygen content due to valve wear may be small. Accordingly, other operational parameters may also be utilized to determine the possibility of valve wear or to distinguish between intake and exhaust valve 72, 74 wear. To that end, FIG. 5 is an embodiment of a graph monitoring the pressure of the exhaust manifold 90. However, as described above, in certain embodiments the pressure of the individual cylinders 28 may be monitored separately. As described above, the lines 124, 126, 128, and 130 may represent different wear scenarios associated with the engine 12. For example, in the illustrated embodiment, the line 124 corresponds to the no-wear scenario in which the pressure of the exhaust manifold 90 is substantially equal to the baseline value 136. In certain embodiments, the baseline value 136 may be determined by experimental operations of the engine 12, normal operations of the engine 12 or a group of engines (e.g., new engines), computer modeling, calculations, user inputs, or the like. As described above, the threshold value 134 may be utilized to determine whether the intake valve 72 and/or the exhaust valve 74 has wear. In certain embodiments, the threshold value 134 is a predetermined value. However, in some embodiments, the threshold value 134 may be 5, 10, 15, 20, 25, 30, 35, 40, 45, 50, 55, 60, 65, 70, 75, 100, 125, 150, or 200 percent lower than the baseline value 133, or any suitable percentage lower than the baseline value 134. Moreover, in some embodiments, the threshold value 134 may be 1.5, 2, 2.3, 3, or any suitable factor greater than the baseline value 136. Accordingly, valve wear may be monitored by evaluating the pressure in the exhaust manifold 90 in comparison to the baseline value 136.

In the illustrated embodiment, similar element numbers are used to define the threshold and baseline values 134, 136, but may be applicable to oxygen content, temperature, and pressure. In the illustrated embodiment, the line 126 represents the pressure in the exhaust manifold 90 during the intake valve wear scenario over the time period 132. As shown, the pressure value represented by line 126 is less than the baseline value 136 across the time intervals 138a, 138b, 138c, 138d. For example, a reduction of combustion charge within the cylinder 28 may indicate intake valve wear and, as a result, reduce the pressure of the exhaust manifold 90. In the illustrated embodiment, the line 126 is not above the threshold value 134. However, as mentioned above, in certain embodiments the ECU 36 may monitor a range (e.g., a threshold above and a threshold below) while evaluating the wear of the intake and/or exhaust valves 72, 74. For example, the ECU 36 may monitor a range of approximately 1, 2, 3, 4, 5, 6, 7, 8, 9, 10, 11, 12, 13, 14, 15, 20, 30, 40 percent plus or minus the threshold value 134 and/or baseline value 136, or any other suitable range, to define upper and lower values which may be indicative of valve wear. Accordingly, the ECU 36 may monitor the pressure of the exhaust manifold 90 to evaluate valve wear, while the pressure of the exhaust manifold 90 is lower than the threshold value 134 and the baseline value 136.

In the illustrated embodiment, the line 128 represents the pressure in the exhaust manifold 90 during the exhaust valve wear scenario over the time period 132. As shown, the value of the pressure represented by the line 128 is greater than threshold value 134 in the time intervals 138c, 138d. Accordingly, the ECU 36 may output a signal indicative of exhaust valve wear, because of the increased pressure measurement in the exhaust manifold 90 (e.g., based on a trend of the exhaust manifold 90 pressure at different combustion intervals). For example, the pressure may increase in the exhaust manifold 90 during the exhaust valve wear scenario, because leakage may occur during the combustion phase of the piston stroke, thereby increasing the pressure in the exhaust manifold 90.

As shown in FIG. 5, the line 130 represents the pressure in the exhaust manifold 90 during the intake and exhaust valve wear scenario. That is, in embodiments where both the intake valve 72 and the exhaust valve 74 experience wear, the value of the pressure represented by the line 130 may be greater than the threshold value 134 (e.g., due to incomplete combustion, due to leakage, etc.). As a result, the ECU 36 may output a signal indicative of valve wear. Moreover, evaluating the timing (e.g., firing order) may enable the ECU 36 to determine which piston-cylinder assembly 50 of a plurality of piston-cylinder assemblies 50 has valve wear. However, as will be described below, further evaluation may be undertaken to determine whether the valve wear is due to intake valve wear, exhaust valve wear, or a combination of both.

Figure 6:
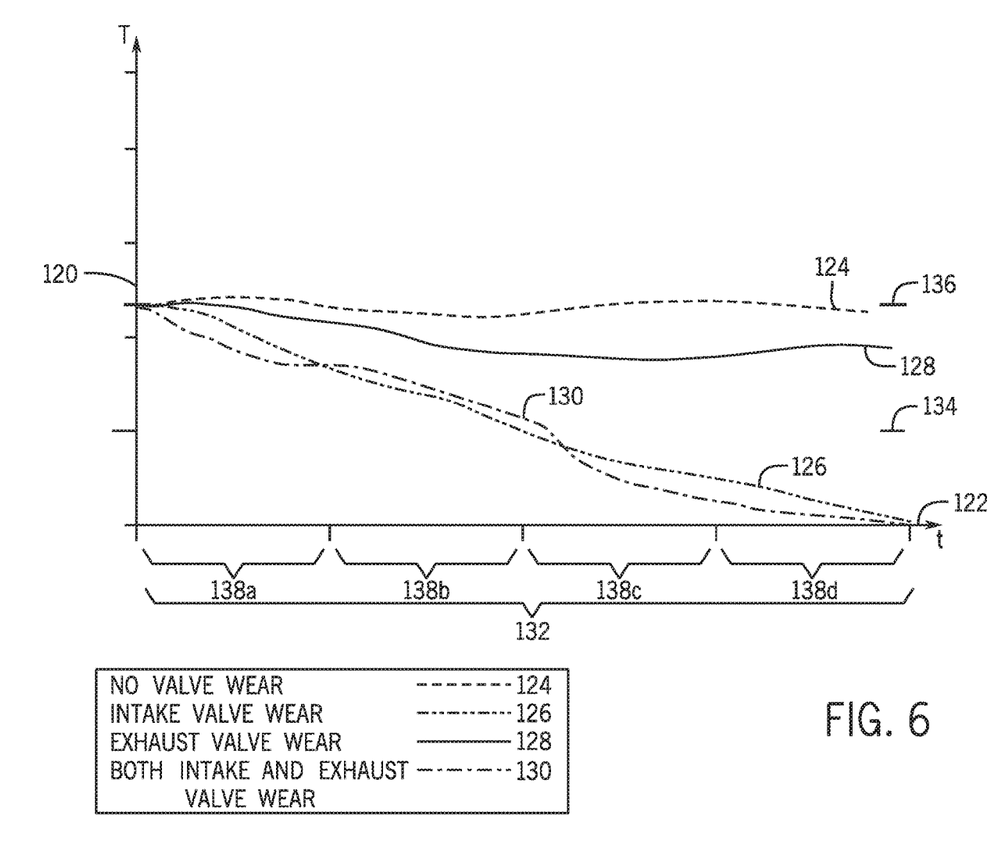
FIG. 6 is an embodiment of a graphical output of a temperature sensor over a time period.

FIG. 6 is an embodiment of a graph monitoring the temperature of the exhaust manifold 90. However, as described above, in certain embodiments the temperature of the individual cylinders 28 may be monitored separately. In the illustrated embodiment, similar element numbers are used to define the threshold and baseline values 134, 136, but may be applicable to oxygen content, temperature, and pressure. In the illustrated embodiment, the line 124 represents the no-wear scenario and is substantially equal to the baseline value 136. Accordingly, the ECU 36 may evaluate the signal and determine that the possibility of wear of the intake and/or exhaust valves 72, 74 is low.

In the illustrated embodiment, the line 126 represents the intake valve wear scenario, in which the temperature of the exhaust manifold 90 is lower than the baseline value 136. As shown in the illustrated embodiment, the temperature represented by the line 126 is less than the threshold value 134. For example, intake valve 72 wear may lead to less charge in the combustion chamber 14, resulting in reduced effective compression ratios and lower outlet temperatures. In certain embodiments, the threshold value 134 may be determined by experimental operations of the engine 12, normal operations of the engine 12 or a group of engines (e.g., new engines), computer modeling, calculations, user inputs, or the like. However, as described above, in some embodiments the threshold value 134 may be a percentage of the baseline value 136. For example, the threshold value 134 may be plus or minus 1, 2, 3, 4, 5, 6, 7, 8, 9, 10, 15, 20, 25, 30 percent, or any suitable percentage of the threshold value 134. As a result, the threshold value 134 may be adjusted for different engines, different operating conditions (e.g., ambient air temperatures, fuel types, oxidant types), or the like. Because the line 126 is less than the threshold value 134 throughout the time intervals 138c, 138d, the ECU 36 may determine that the possibility of valve wear is increased.

Additionally, the line 128 represents the exhaust valve wear scenario, in which the temperature of the exhaust manifold 90 is lower than the baseline value 136, but not lower than the threshold value 134. Accordingly, in the illustrated embodiment, the ECU 36 may evaluate the temperature of the exhaust manifold 90 and determine that the possibility of valve wear to the exhaust valve 74 is low based on line 128. However, in some embodiments, the threshold value 134 may be set such that small reductions in the temperature of the exhaust manifold 90 may trigger a signal from the ECU 36. Moreover, in certain embodiments, a combination of indicators (e.g., from pressure and temperature, from oxygen and temperature, from oxygen and pressure, etc.) may be indicative of valve wear, as opposed to one indicator (e.g., only oxygen, only pressure, only temperature).

In the illustrated embodiment, the line 130 represents the intake and exhaust valve wear scenario, in which the temperature represented by the line 130 is lower than the threshold value 134. Accordingly, the ECU 36 may determine that the possibility of valve wear is increased because the temperature represented by the line 130 is lower than the threshold value 134 during the time intervals 138c, 138d. In this manner, the ECU 36 may output a signal indicative of valve wear. Moreover, evaluating the timing (e.g., firing order) may enable the ECU 36 to determine which piston-cylinder assembly 50 of a plurality of piston-cylinder assemblies 50 has valve wear.

Figure 7:
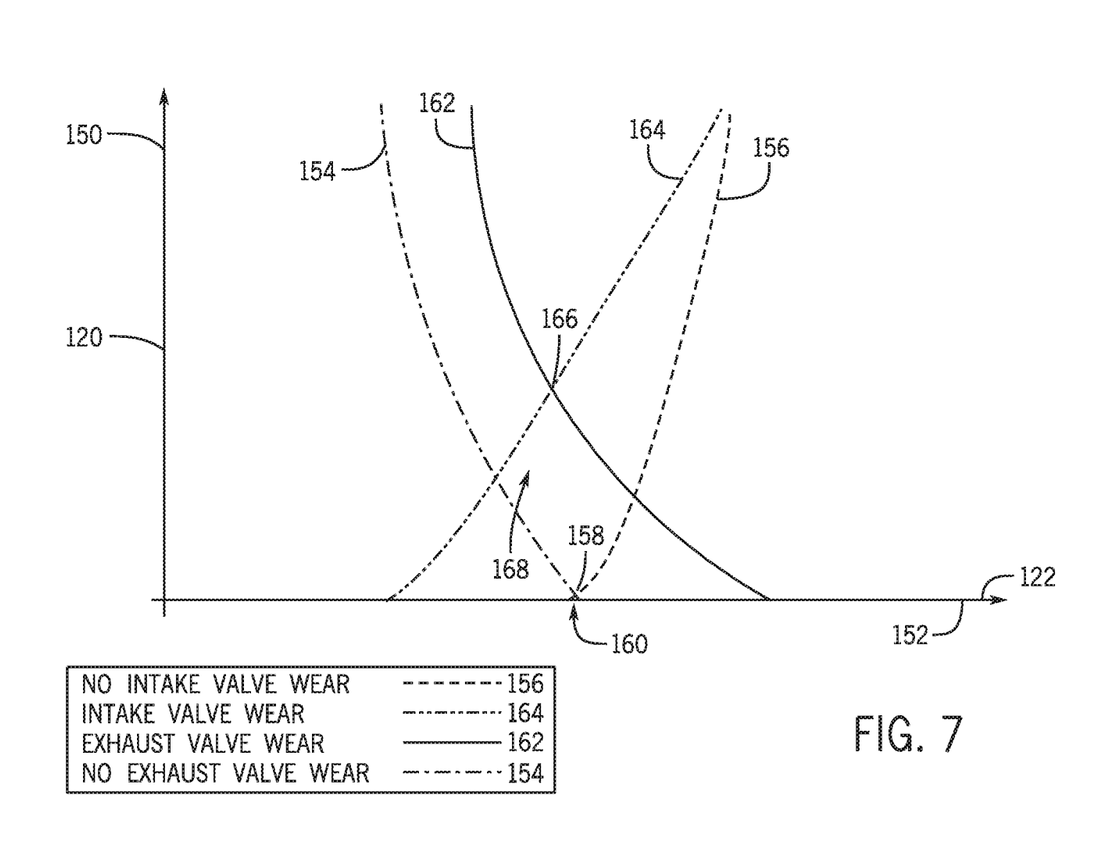
FIG. 7 is an embodiment of a graphical output of a crankshaft sensor over a time period.

FIG. 7 is an embodiment of a graph monitoring a lift 150 of the intake and exhaust valves 72, 74 relative to a crank angle 152. In the illustrated embodiment, the vertical axis 120 is representative of the lift 150. As used herein, the lift 150 refers to the movement of the intake and/or exhaust valves 72, 74 away from seats to enable injection into and expulsion from the combustion chamber 14. Additionally, the horizontal axis 122 is representative of the crank angle 152. As described above, the crank angle describes the angle of rotation of the crankshaft 64 as the piston 24 moves between TDC and BDC. In the illustrated embodiment, a line 154 is representative of a no exhaust valve wear scenario, in which the exhaust valve 74 does not have appreciable wear. In other words, the exhaust valve 74 is configured to open to enable the hot exhaust to exit the combustion chamber 14 and enter the exhaust manifold 90 without experiencing appreciable leakage. As shown, a line 156 is representative of a no intake valve wear scenario, in which the intake valve 72 does not have appreciable wear. The intake valve 72 is configured to open (e.g., increase the value of the lift) after the exhaust valve 74 shuts (e.g., decrease the value of the lift) to enable injection of the oxidant 18 and the fuel 20 into the combustion chamber 14. As shown, a crossing point 158 indicates an intentional overlap between the opening of the intake valve 72 and the closure of the exhaust valve 74. The area under the line 154 and the line 156 at the crossing point 158 may be referred to as the no-wear overlap 160. As will be described above, monitoring the crossing point 158 and/or the no-wear overlap 160 may be utilized to determine the possibility of wear to the intake and/or exhaust valves 72, 74.

In the illustrated embodiment, a line 162 is representative of an exhaust valve wear scenario. That is, the exhaust valve 72 may experience corrosion, erosion, deformation, or the like which may block or hinder opening and closing of the valve. For example, erosion to the exhaust valve 72 may block a tight seal between the exhaust valve 72 and a seat. Moreover, in some embodiments, wear to a spring of the exhaust valve 72 may hinder opening and closing. As shown, the line 162 indicates valve closure (e.g., lift is approximately equal to zero) later (e.g., at a larger crank angle) than the line 154 representing the no exhaust valve wear scenario. As a result, the exhaust valve 72 remains open longer, which may enable oxidant 18 to enter the exhaust manifold 90 directly from the intake manifold 84 without reacting within the combustion chamber 14. Furthermore, a line 164 is representative of an intake valve wear scenario. As shown, the line 164 indicates valve opening at an earlier crank angle 152 than the intake valve 72 of line 156 As a result, a second crossing point 166 is higher (e.g., has a larger lift value) than the crossing point 158. Accordingly, the overlap 168 is larger than the overlap 160, thereby forming a longer duration in which both the intake valve 72 and the exhaust valve 74 are open during each stroke. Because the overlaps 160, 168 may be indicative of valve wear, the ECU 36 may monitor the overlaps 160, 168 (e.g., via the crankshaft sensor 80, via position sensors, via displacement sensors) as indicators of valve wear.

Figure 8:
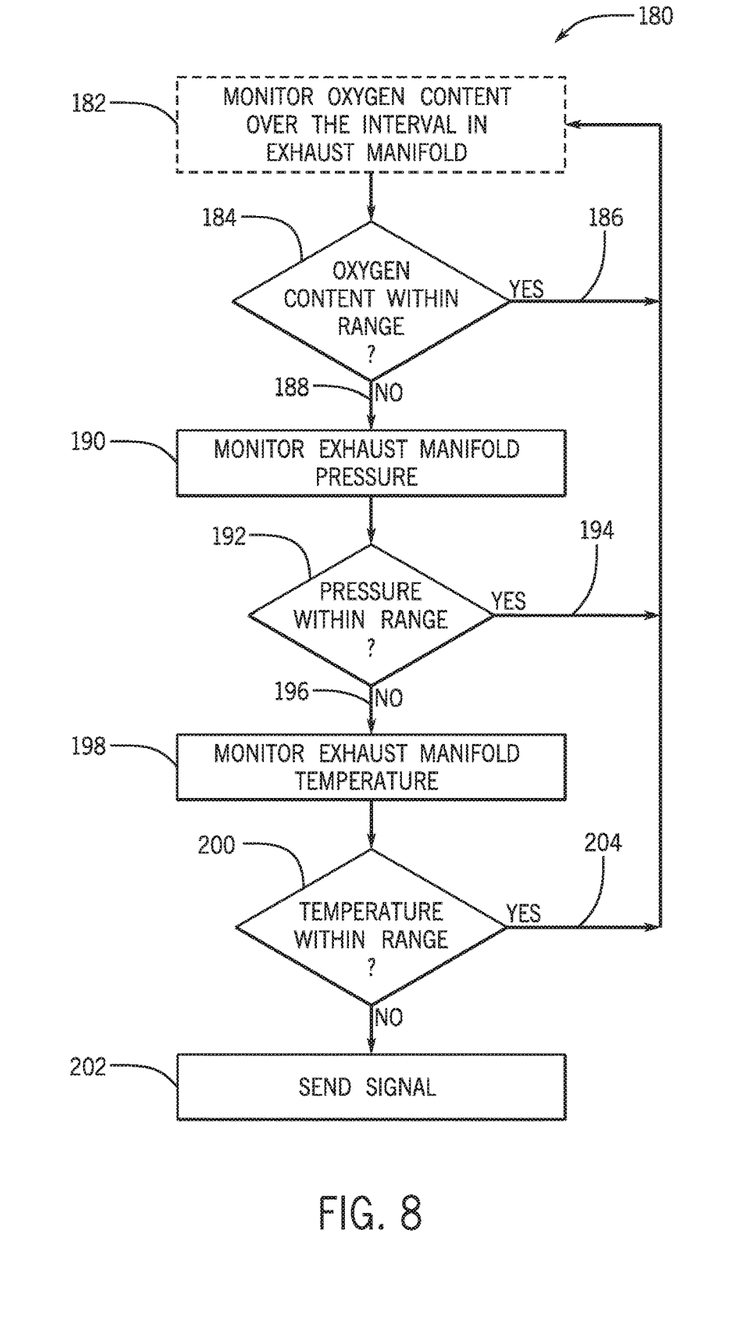
FIG. 8 is an embodiment of a flow chart for a method of detecting valve wear using one or more sensors.

FIG. 8 is a flow chart of an embodiment of a computer-implemented method 180 for monitoring the possibility of wear to the intake and exhaust valves 72, 74. In the illustrated embodiment, the oxygen content of the exhaust manifold 90 is monitored by the ECU 36 over the time interval 138 (block 182). For example, the oxygen sensor 92 positioned in the exhaust manifold 90 (or positioned at an exhaust outlet of each piston-cylinder assembly 50) may send a first signal to the ECU 36 indicative of the oxygen content (e.g., amount of oxygen) in the exhaust manifold 90. Moreover, as described above, the time interval 138 may be a portion of the time period 132 or the entire time period 132. By monitoring the oxygen content over the time interval 138, the ECU 36 may distinguish between potential valve wear and temporary upsets and/or spikes. In certain embodiments, the ECU 36 determines whether the oxygen content in the exhaust manifold 90 is within a range (block 184). For example, the range may include one or more threshold values 134 (e.g., an upper threshold and/or a lower threshold). The ECU 36 may monitor the first signal from the oxygen sensor 92 over the time interval 138. In embodiments in which the oxygen content is within the range, the ECU 36 may continue to monitor the oxygen content (186). However, in embodiments in which the oxygen content is outside of the range defined by the threshold values 134, the ECU 36 may proceed with further evaluation of the operating parameters of the system 10 (188). In certain embodiments, the evaluation of the oxygen content of the exhaust manifold 90 and/or the oxygen content at each outlet of the piston-cylinder assembly 50 may compare the measured oxygen level against a threshold and/or triggering value. For example, the method 180 may proceed only if the oxygen content it outside of the range. However, in some embodiments, the oxygen content may be at least one operating parameter evaluated by the ECU 36 to determine whether the inlet and/or exhaust valves 72, 74 are worn. Moreover, in certain embodiments, the oxygen content may not be monitored or utilized to detect valve wear.

The pressure of the exhaust manifold 90 is monitored by the ECU 36 (e.g., via a signal from the pressure sensor 86) over the time interval 138 (block 190). As described above, in certain embodiments, the pressure of the entire exhaust manifold 90 may be monitored by the pressure sensor 86. However, in some embodiments, individual pressure values for each piston-cylinder assembly 50 may be monitored by pressure sensors 86 and output to the ECU 36 (e.g., via a signal). Thereafter, the pressure of the exhaust manifold 90 or individual piston-cylinder assemblies 50 may be evaluated by the ECU 36 to determine whether the pressure is within a range (block 192). For example, the ECU 36 may evaluate whether the pressure is above or below the thresholds 134. In certain embodiments, pressure values below a lower threshold may be indicative of intake valve wear, as shown in FIG. 5. However, in some embodiments, pressure values above an upper threshold may be indicative of exhaust valve wear, as shown in FIG. 5. It is appreciated that different engine types, operating conditions, and the like may include a variety of pressure indicators to determine whether the intake and/or exhaust valves 72, 74 are worn. While the pressure value from the pressure sensor 86 is within the range, the ECU 36 may continue monitoring parameters of the system 10 (194). However, in embodiments where the value from the pressure sensor 86 is outside of the range, the ECU 36 may proceed to monitor additional parameters of the system 10 (196).

In the illustrated embodiment, the ECU 36 monitors the temperature of the exhaust manifold 90 (block 198) for the time interval 138. For example, the ECU 36 may receive a temperature signal from the temperature sensor 88 positioned on/within the exhaust manifold 90. However, in some embodiments, one or more temperature sensors 88 may be positioned at the respective outlets of the piston assemblies 50. Additionally, in the illustrated embodiment, the ECU 36 determines whether the temperature signal is within a range (block 200). For example, the range may include upper and/or lower thresholds 134. In embodiments where the temperature is outside of the range (e.g., above the upper threshold or below the lower threshold), the ECU 36 may send a fourth signal indicative of the possibility of valve wear (block 202). For example, the signal may be an alert to inform the operator of the possibility of valve wear. In some embodiments, the signal may send an alert to schedule maintenance or to shut down the system 10. Moreover, in some embodiments, the signal may alert the operator to adjust operating parameters of the engine 12 to avoid shutting down the engine 12. However, in embodiments where the temperature signal is within the range, the ECU 36 may continue to monitor the oxygen content of the exhaust manifold 90 (204).

Figure 9:
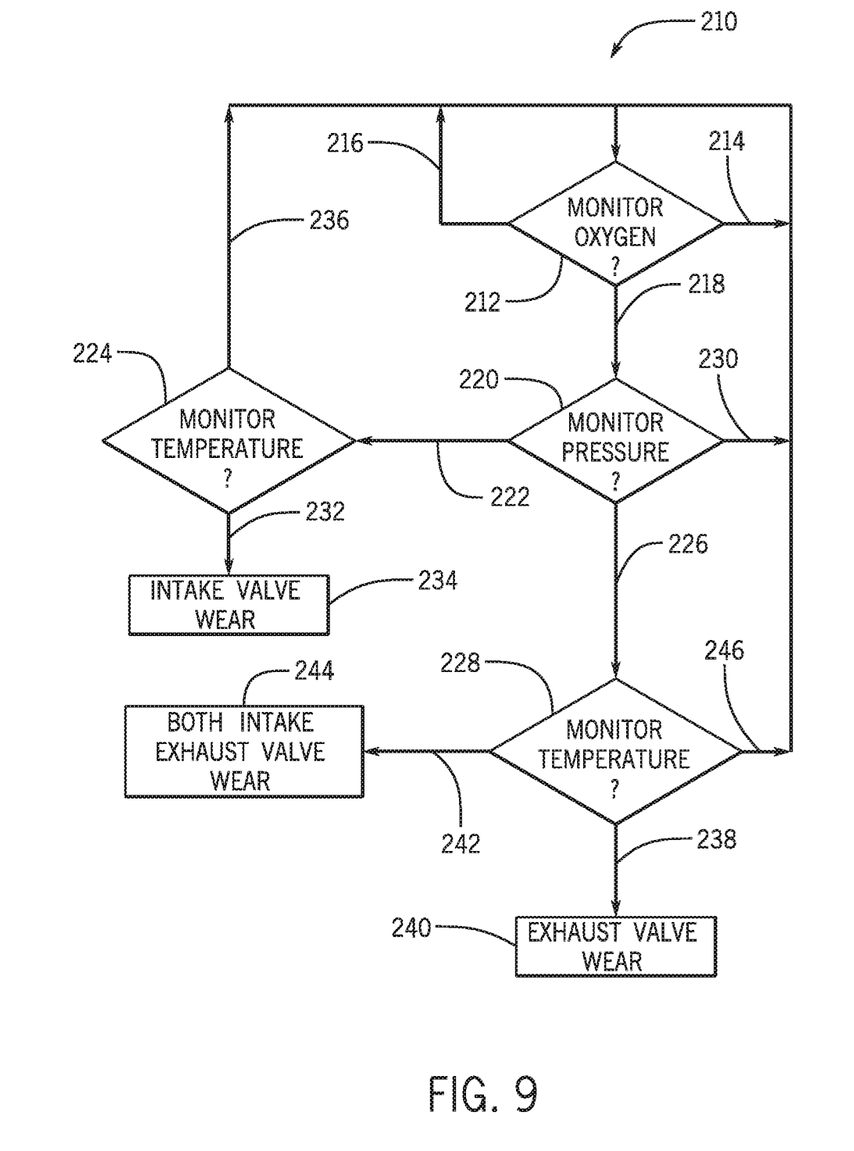
FIG. 9 is an embodiment of a flow chart for logic for determining the possibility of a valve wear scenario.

FIG. 9 is a flow chart of an embodiment of computer-implemented logic 210 that may be utilized by the ECU 36 to determine the type of wear present in the engine 12. It is appreciated that the flow chart is an embodiment of the logic 210 utilized for the wear conditions presented in the graphs of FIGS. 4-6 and may be different for other types of engines or operating conditions. In the illustrated embodiment, the ECU 36 monitors the oxygen content of the exhaust manifold 90 via the oxygen sensor 92 (operator 212). The ECU 36 may continue to monitor the oxygen content while the oxygen sensor 92 returns a value that is approximately equal to the baseline value 136 (214). Moreover, the ECU 36 may continue to monitor the oxygen content while the oxygen sensor 92 returns a value that is less than the baseline value 136 (216). However, while the oxygen sensor 92 returns a value that is more than the baseline value 136 (line 218), the ECU 36 may monitor the pressure of the exhaust manifold 90 via the pressure sensor 86 (operator 220). In other words, in the illustrated embodiment, detection of the oxygen content being higher than the baseline value 136 may be a trigger event to continue monitoring additional operational parameters of the engine 12.

In the illustrated embodiment, the ECU 36 may evaluate the value of the pressure in the exhaust manifold 90, and the compare the value to the baseline value 136 and/or the threshold value(s) 134. In embodiments where the value is less than the baseline value 136 and/or the threshold value 134 (line 222), the ECU 36 may proceed to evaluate the temperature of the exhaust manifold 90 via the temperature sensor 88 (operator 224). Additionally, in embodiments where the pressure is greater than the baseline value 136 and/or the threshold value 134 (line 226), the ECU 36 may proceed to evaluate the temperature (operator 228). Furthermore, in embodiments where the value of the pressure is approximately equal to the baseline value 136 and/or within the threshold(s) 134, the ECU 36 may continue to monitor the oxygen content of the exhaust manifold 90 via the oxygen sensor 92 (line 230). In this manner, the pressure of the exhaust manifold 90 may serve as a further triggering event to continue monitoring additional operational parameters of the engine 12.

As mentioned above, in certain embodiments the ECU 36 may determine that the pressure of the exhaust manifold 90 is lower than the baseline value 136 and/or the threshold value 134 (line 222). As the ECU 36 monitors the temperature of the exhaust manifold 90 (operator 224), the ECU 36 may determine that the temperature is lower than the baseline value 136 and/or the threshold value 134 (line 232). As a result, the ECU 36 may determine that the possibility of the inlet valve wear scenario is increased (block 234). Moreover, the ECU 36 may determine that the temperature is approximately equal to the baseline value 136 and continue to monitor the oxygen content (line 236). However, in some embodiments, the ECU 36 may determine that the pressure of the exhaust manifold 90 is higher than the baseline value 136 and/or the threshold value 134 (line 226). As a result, the ECU 36 monitors the temperature of the exhaust manifold 90 (operator 228). In certain embodiments, the ECU 36 may determine that the temperature is lower than the baseline value 136 (line 238). As a result, the ECU 36 may determine that the possibility of the exhaust vale wear scenario is increased (block 240). Furthermore, in certain embodiments, the ECU 36 may determine the temperature is lower than the threshold value 134 (line 242). Accordingly, the ECU 36 may determine that the possibility of both the intake and exhaust valve wear scenario is increased (block 244). Furthermore, in some embodiments, the ECU 36 may determine that the temperature is approximately equal to the baseline value 136 and continue to monitor the oxygen content (line 246).

As described in detail above, continuous monitoring of various operational parameters of the engine 12 may be utilized to determine the possibility of valve wear. For example, in certain embodiments, the ECU 36 may evaluate signals from various sensors 34 (e.g., the oxygen sensor 92, the pressure sensor 86, the temperature sensor 88, etc.). The ECU 36 may evaluate threshold values 134 to determine whether or not the operational parameters are within normal operating ranges. In certain embodiments, a triggering event of one of the operational parameters may facilitate further evaluation of the operational parameters of the engine 12 to detect valve wear. For example, detection of a higher than normal oxygen content may be the triggering event to further evaluate the pressure and temperature of the exhaust manifold 90. Accordingly, analysis of the operational parameters may be utilized to predict the possibility of valve wear, thereby enabling the operators to schedule shut downs or planned maintenance activities.

By detecting the various operational parameters of the engine 12, the ECU 36 may identify valve wear in the piston cylinder assemblies 50. For example, identification of an increased oxygen content in the exhaust manifold 90, a reduced pressure in the exhaust manifold 90, and a reduced temperature in the exhaust manifold 90 may be indicative of intake valve wear. Additionally, identification of an increased oxygen content in the exhaust manifold 90, an increased pressure in the exhaust manifold 90, and a reduced temperature in the exhaust manifold 90 may be indicative of exhaust valve wear. Furthermore, identification of an increased oxygen content in the exhaust manifold 90, an increased pressure in the exhaust manifold 90, and a greatly reduced temperature in the exhaust manifold 90 may be indicative of both intake and exhaust valve wear. Accordingly, the ECU 36 may identify and alert the operator which valve of the piston cylinder assemblies 50 may experience wear.

Figure 10:
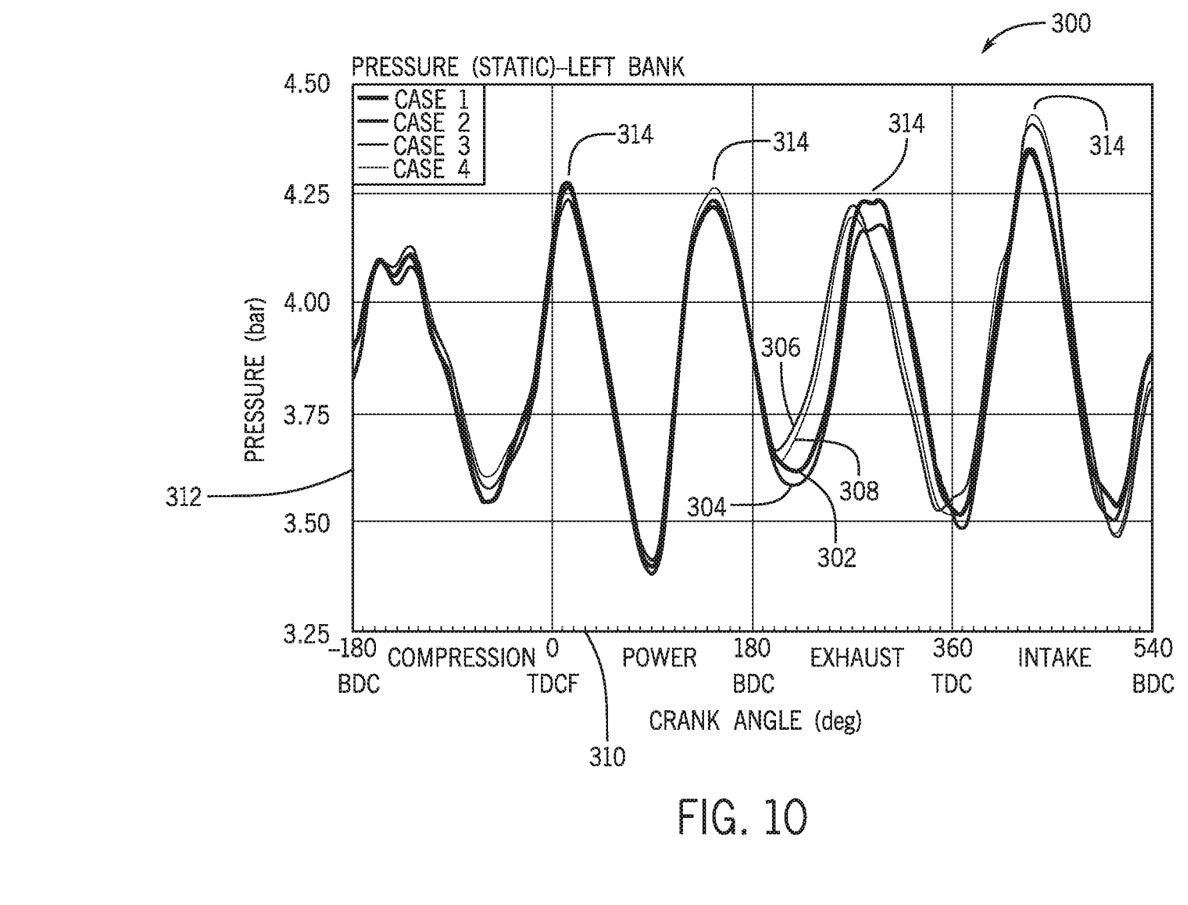
FIG. 10 is an embodiment of a graphical output of a pressure sensor over a period of time.

Turning now to FIG. 10, the figure depicts an embodiment of a graphical output or graph 300 of a pressure sensor over a period of time. More specifically, the graph 300 includes curves 302, 304, 306, and 308 plotted over an x-axis 310 representative of crank angle (or time) and a y-axis 312 representative of pressure. In the depicted embodiment, the ECU 36 may monitor for pressure pulses. That is, one or more of the peaks in the curves 302, 304, 306, and 308, such as the peaks 314, may be representative of an exhaust pressure pulse that may be indicative of a problematic cylinder facing valve wear. Accordingly, when a pulse or pulses 314 is detected, the ECU 36 may derive that valve wear may occur at a given cylinder. Further, in certain embodiments the valve that caused the pressure pulse 314 may be identified by the crank angle of the pulse 314, by location of the knock sensor, or via a combination thereof. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a reciprocating engine having a piston disposed in a cylinder, an intake valve, an exhaust valve, and an exhaust flow path downstream of the exhaust valve;
a first sensor configured to obtain a first feedback indicative of an exhaust gas parameter in the exhaust flow path; and a controller configured to identify a valve wear condition of at least one of the intake valve or the exhaust valve at least partially based on the first feedback from the first sensor, wherein the controller is configured to correlate the valve wear condition specifically to one valve of the intake valve or the exhaust valve.

2. The system of claim 1, wherein the exhaust gas parameter comprises an exhaust gas composition.

3. The system of claim 2, wherein the first sensor comprises an oxygen sensor, a fuel sensor, or a combination thereof.

4. The system of claim 2, comprising a second sensor configured to obtain a second feedback indicative of an exhaust temperature in the exhaust flow path, wherein the controller is configured to identify the valve wear condition of at least one of the intake valve or the exhaust valve at least partially based on the first feedback from the first sensor and the second feedback from the second sensor.

5. The system of claim 4, comprising a third sensor configured to obtain a third feedback indicative of an exhaust pressure in the exhaust flow path, wherein the controller is configured to identify the valve wear condition of at least one of the intake valve or the exhaust valve at least partially based on the first feedback from the first sensor, the second feedback from the second sensor, and the third feedback from the third sensor.

6. The system of claim 1, comprising one or more additional sensors configured to obtain additional feedback indicative of an exhaust temperature, an exhaust pressure, a crank angle, a valve movement of the intake valve or the exhaust valve, or any combination thereof, wherein the controller is configured to identify the valve wear condition of at least one of the intake valve or the exhaust valve at least partially based on the first feedback from the first sensor and the additional feedback from the one or more additional sensors.

7. The system of claim 1, wherein the controller is configured to compare the first feedback against one or more threshold values to help identify the valve wear condition of at least one of the intake valve or the exhaust valve.

8. The system of claim 1, wherein the controller is configured to identify a specific piston-cylinder assembly among a plurality of piston-cylinder assemblies having the valve wear condition of at least one of the intake valve or the exhaust valve.

9. The system of claim 1, wherein the controller is configured to generate an alert, an alarm, a control signal to the reciprocating engine, a maintenance request or schedule, or any combination thereof, in response to identification of the valve wear condition.

10. The system of claim 1, wherein the first sensor is coupled to an exhaust manifold having the exhaust flow path.

11. A non-transitory computer readable medium comprising executable instructions that, when executed, cause a processor to:
obtain, from a first sensor, a first feedback indicative of an exhaust gas parameter in an exhaust flow path downstream from an exhaust valve of a reciprocating engine, wherein the reciprocating engine has a piston disposed in a cylinder, an intake valve, and the exhaust valve;
identify a valve wear condition of at least one of the intake valve or the exhaust valve at least partially based on the first feedback from the first sensor, wherein the exhaust gas parameter comprises an exhaust gas composition, wherein the exhaust gas composition comprises an oxygen content, a fuel content, or a combination thereof;
obtain, from a second sensor, a second feedback indicative of an exhaust temperature in the exhaust flow path;
identify the valve wear condition of at least one of the intake valve or the exhaust valve at least partially based on the first feedback from the first sensor and the second feedback from the second sensor;
obtain, from a third sensor, a third feedback indicative of an exhaust pressure in the exhaust flow path; and
identify the valve wear condition of at least one of the intake valve or the exhaust valve at least partially based on the first feedback from the first sensor, the second feedback from the second sensor, and the third feedback from the third sensor.

12. The non-transitory computer readable medium of claim 11, wherein the executable instructions, when executed, cause the processor to:
obtain, from one or more additional sensors, an additional feedback indicative of an exhaust temperature, an exhaust pressure, a crank angle, a valve movement of the intake valve or the exhaust valve, or any combination thereof; and
identify the valve wear condition of at least one of the intake valve or the exhaust valve at least partially based on the first feedback from the first sensor and the additional feedback from the one or more additional sensors.

13. A method, comprising:
obtaining, from a first sensor, a first feedback indicative of an exhaust gas parameter in an exhaust flow path downstream from an exhaust valve of a reciprocating engine, wherein the reciprocating engine has a piston disposed in a cylinder, an intake valve, and the exhaust valve;
identifying a valve wear condition of at least one of the intake valve or the exhaust valve at least partially based on the first feedback from the first sensor, wherein the exhaust gas parameter comprises an exhaust gas composition, wherein the exhaust gas composition comprises an oxygen content, a fuel content, or a combination thereof;
obtaining, from a second sensor, a second feedback indicative of an exhaust temperature in the exhaust flow path;
identifying the valve wear condition of at least one of the intake valve or the exhaust valve at least partially based on the first feedback from the first sensor and the second feedback from the second sensor;
obtaining, from a third sensor, a third feedback indicative of an exhaust pressure in the exhaust flow path; and
identifying the valve wear condition of at least one of the intake valve or the exhaust valve at least partially based on the first feedback from the first sensor, the second feedback from the second sensor, and the third feedback from the third sensor.

* * * * *